Jan. 20, 1948.  M. D. KOPPELMAN  2,434,703

DRY CELL CLOSURE

Filed May 25, 1943

INVENTOR.
Morris D. Koppelman
BY
Pennie, Davis, Marvin & Edmonds
ATTORNEYS

Patented Jan. 20, 1948

2,434,703

UNITED STATES PATENT OFFICE 2,434,703

DRY CELL CLOSURE

Morris D. Koppelman, New Haven, Conn., assignor to Olin Industries, Inc., a corporation of Delaware Application May 25, 1943, Serial No. 488,334

1 Claim. (Cl. 136—133)

This invention relates to dry cells and more particularly to an improved construction of a leakproof cell for flashlights.

In a prior patent of Olaneta No. 1,623,719, granted April 5, 1927, there is described and claimed a dry cell in which the zinc cup is surrounded by a metal can, which is insulated from the zinc cup and in which suitable terminal leads are connected to the upper edge of the zinc cup and to the carbon electrode. While such construction may be used to advantage in the manufacture of the larger sizes of cells in which both terminals are placed at the top, it is not capable of use in flashlight cells where the bottom of the zinc can ordinarily serves as a terminal to be engaged by the contact cap carried by the carbon electrode of a second cell in a flashlight casing.

It has recently been proposed to construct a leakproof cell for flashlights in which the zinc can is surrounded by a metal jacket, and in which the end of the jacket is crimped over the edge of the bottom of the zinc can and over the edge of the upper closure of the cell. In such construction it is necessary to electrically insulate the jacket from the zinc can to prevent short circuiting of the cell.

In the present invention I provide a leakproof flashlight cell which does not require insulation of the outer jacket from the bottom of the zinc can. In constructing the cell of the present invention, I provide an outer container or jacket of a suitable material, such as steel, and crimp the upper edge of the container over the upper closure member of the cell. To permit the use of a metallic jacket in electrical contact with the zinc can, and at the same time avoid short circuiting of the cells, I employ a non-short circuiting closure member of the type disclosed in the patent to Clifford R. Lines, No. 2,143,245, granted on January 10, 1939.

Such construction possesses several advantages over the leakproof cells now on the market. The use of an outer container, instead of an open ended tube or cylinder, permits easier assembly of the cell and the jacket and reduces the operations necessary to secure the jacket to the cell. Furthermore, it provides additional strength for the bottom of the cell and eliminates the use of an extra bottom member now employed on some of the leakproof cells on the market.

These, and other advantages of the invention, will be apparent from the following description and from the accompanying drawing in which.

Figure 1:
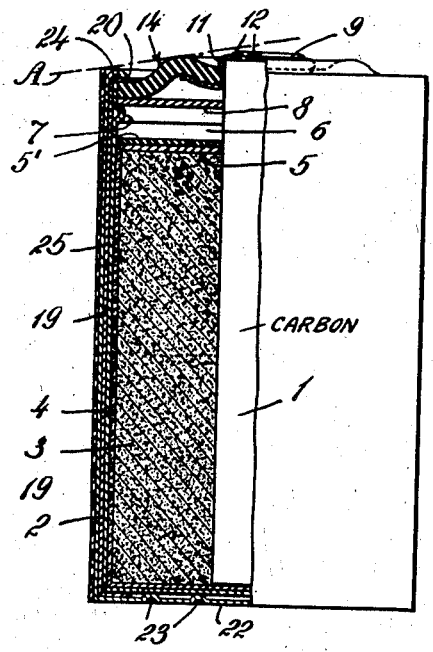
Fig. 1 is a side elevation of a cell, partly in section.
Figure 2:
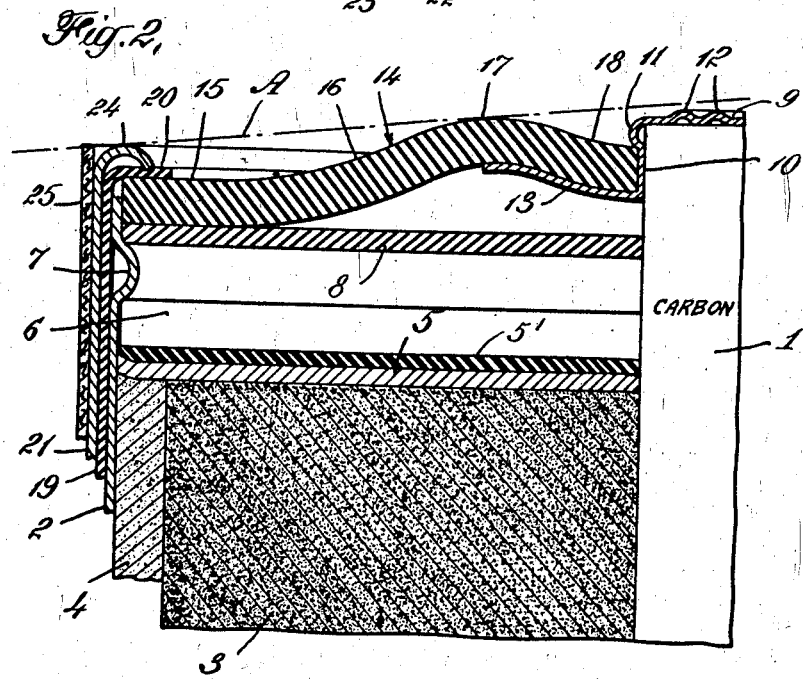
Fig. 2 is an enlarged, vertical, sectional view of the upper portion of the cell.

Referring to the drawing, the reference numeral 1 designates the usual carbon electrode which is arranged centrally of a zinc cup or can 2 forming the other electrode of the cell. The carbon electrode projects slightly beyond the top of the zinc can to provide one of the terminals of the cell. The cell may be of the conventional construction comprising a depolarizing core 3 of graphite or carbon and manganese dioxide surrounding the central electrode and with the usual electrolyte paste 4 between the core and the can. A paraffined paper washer 5 is preferably arranged on the top of the core and slightly spaced from the top of the cell to provide a gas space 6. A layer of plastic material 5', such as asphalt or the like, may be arranged over washer 5 as an additional sub-seal, if desired. Adjacent the top, the zinc can is provided with an inwardly extending bead 7 and a second washer 8 is arranged thereon. A metallic cap 9 snugly engages the upper end of the carbon pencil and forms one of the terminals of the cell. The cap is preferably provided with a constricted portion 10 which engages the periphery of the carbon pencil providing a bead or shoulder 11 between the constricted portion and the upper surface of the cap. The cap may be provided with rings or ridges 12 to insure good electrical connection with another cell or a contact member mounted in a flashlight casing.

Below the constricted portion the cap is flared or extended outwardly as at 13. A closure disc 14 of suitable insulating material, such as molded plastic, hard fibre board or the like, is mounted on the cap between the bead or shoulder 11 and the outwardly extending portion 13 and is thus securely fastened to the cap. A layer of rubber-like cement, such as Pliofilm, may be arranged between the flared portion 13 of the cap and the closure disc. The closure disc may be made of moldable material, and the skirt 13 molded into the closure disc. To permit use of an outer metallic jacket in electrical contact with the zinc can and at the same time to avoid short circuiting of the cell, the closure member 14 is made of a special form. As shown, the outer portion 14 is substantially flat and the disc then curves upwardly as at 16 to a peak 17. Beyond the peak the surface then curves downwardly as indicated at 18. This provides a construction wherein a line connecting the two terminals of the cell passes through the material of the closure. Stated in other words, a straight edge in engagement with the closure at the peak 17 and with one of the terminals of the cell cannot contact with the other terminal as indicated by the broken line A.

The closure disc 14 is substantially flush with the upper edge of the zinc can as shown in the drawing. The vertical wall of the zinc can is preferably covered by a layer 19 of asphalt- or pitch-impregnated paper or the like. The upper edge of the paper wrapping 19 is extended over the peripheral portion of the closure member as indicated at 20, and it also extends over a portion of the bottom of the zinc can, as shown in Fig. 1. An outer jacket, which may be in the form of a can 21, surrounds the side wall of the cell and is provided with a bottom 22 arranged in contact with the bottom of the zinc cup as shown. The bottom of the container may be provided with indented rings 23 or similar provision to insure contact between it and the zinc can. The upper edge of the jacket 21 is crimped over the closure member as indicated at 24 and a suitable paper tube 25, bearing printed matter or the like, may be arranged on the exterior of the jacket.

It will be seen that the bottom 22 of the jacket 21 is in electrical contact with the zinc can of the cell and therefore forms one of the terminals of the cell. The cap 9, carried by the carbon pencil, forms the other terminal of the cell. While it has heretofore been considered necessary to insulate the jacket from both of the electrodes of the cell, it will be apparent that the construction disclosed provides a jacketed cell in which insulation between the jacket and the zinc electrode is not necessary. A second cell placed in axial alignment with the cell cannot cause a short circuit between the crimped edge 24 of the metal can and the terminal 9 because of the use of the non-short circuiting closure disc 14. If the upper cell becomes tilted so that it is in contact with the edge 24 of the can, it is out of contact with the central terminal 9 as indicated by the line A. The particular construction of the closure member 14 may of course be varied within wide limits, provided that it includes a raised portion corresponding to the peak 17 between the central opening which receives the cap and the outer edge. This raised portion, however, should be lower than the top of the cap 9 to insure good electrical contact between the terminal 9 and the bottom of another cell or contact in a flashlight casing.

The outer jacket 21 may be made of any suitable metal having sufficient strength to withstand the pressures which may be generated within the cell. It is preferably made of sheet steel. While the provision of the wrapping 19 of asphalt- or pitch-impregnated paper is not essential because it is unnecessary to insulate the jacket 21 from the zinc can, it is preferably employed as it serves as a cushioning member between the can and the jacket and allows for irregularities in the adjacent surfaces of either of them. It furthermore will help retain any liquid or paste which may seep out of the cell between the closure member and the zinc can when a pressure is created in the cell. Such seepage or oozing of liquid or paste is thus prevented from getting outside of the jacket and corroding any parts of the flashlight casing.

In place of the impregnated paper wrapping 19, the inner surface of the jacket may be coated with a corrosive resisting material, such as paint, lacquer, a film of rubber or the like. Such coating may be used with a sheet of unimpregnated, absorbent paper. Also the paper 19, instead of being impregnated, may be coated with asphalt, pitch or the like on its outer surface. Such coating would protect the jacket from corrosion, and at the same time, permit the uncoated inner surface to more readily absorb any seepage from the cell.

I claim:

A leakproof cell comprising a zinc can forming an electrode, a carbon electrode arranged in the can, an outer metallic container surrounding the zinc can, a jacket of insulating material arranged between the wall of the can and the wall of the container, the bottom of the container being in electrical contact with the zinc can, and a closure of molded insulating material arranged at the upper end of the cell, the upper edge of the insulating jacket and the upper edge of the container being crimped over the top of the periphery of the closure member, the shape of the closure member being such that a line tangent to the upper edge of the container and to the upper end of the carbon electrode passes through the material of the closure member.

MORRIS D. KOPPELMAN.

REFERENCES CITED

The following references are of record in the file of this patent:

UNITED STATES PATENTS

| Number | Name | Date |
|---|---|---|
| 1,552,414 | Apostoloff | Sept. 8, 1925 |
| 2,346,640 | Anthony | Apr. 18, 1944 |
| 1,461,413 | Doe | Aug. 7, 1923 |
| 2,322,456 | McEachron et al. | Oct. 19, 1943 |
| 902,173 | Schauli | Oct. 27, 1908 |
| 2,143,245 | Lines | Jan. 10, 1939 |
| 2,158,151 | Reinhardt | May 16, 1939 |
| 2,198,423 | Anthony | Apr. 23, 1940 |
| 2,149,169 | Gelardin | Feb. 28, 1939 |

FOREIGN PATENTS

| Number | Country | Date |
|---|---|---|
| 398,701 | Great Britain | Sept. 21, 1933 |